Figure 1:
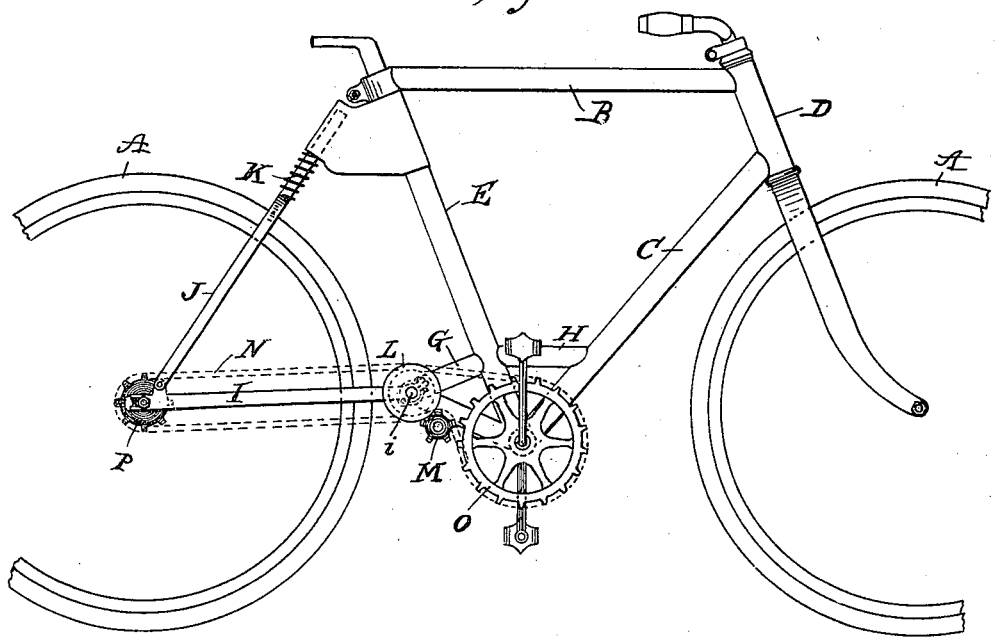

No. 667,594. Patented Feb. 5, 1901.
C. SOUCY, Jr.
DRIVING MECHANISM FOR BICYCLES.
(Application filed June 25, 1900.)

(No Model.)

Witnesses　　　　　　　　　　　　　　　　Inventor

By his Attorney

UNITED STATES PATENT OFFICE.

CYPRIEN SOUCY, JR., OF MANCHESTER, NEW HAMPSHIRE.

DRIVING MECHANISM FOR BICYCLES.

SPECIFICATION forming part of Letters Patent No. 667,594, dated February 5, 1901.

Application filed June 25, 1900. Serial No. 21,444. (No model.)

*To all whom it may concern:*

Be it known that I, CYPRIEN SOUCY, Jr., a citizen of the United States, residing at Manchester, in the county of Hillsborough and State of New Hampshire, have invented certain new and useful Improvements in Driving Mechanism for Bicycles; and I do hereby declare the following to be a full, clear, and exact description of the invention, such as will enable others skilled in the art to which it appertains to make and use the same.

This invention relates especially to the driving-gear of a bicyle and certain chain connections for accommodating the same. The arrangement of my improved gears and the driving-chain are especially adapted for and perform this function only when the rear fork and stay of a bicycle-frame are pivotally connected to the latter.

The object of the invention is to maintain a uniform distance between the riding-saddle and the crank-hanger of a machine, this avoiding any jerky motion of the pedals which would otherwise occur if the chains were running directly from the small sprocket over the large sprocket and a spring-seat and pneumatic tires were used. Hence my invention consists, broadly, in means whereby the chain, instead of assuming an angular course between the small and large sprockets, is permitted to pass over a loose pulley of a size corresponding to that of the small sprocket and locating the loose pulley upon a plane above that of either sprocket, as will be fully set forth in the following specification and claims and clearly illustrated in the drawings accompanying and forming a part of the same, of which—

Figure 2:
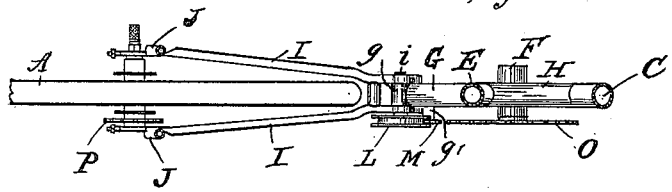
Figure 3:
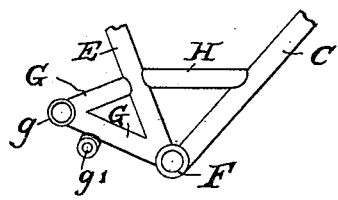

Figure 1 is a broken side elevation of a bicycle to which my improvements are applied. Fig. 2 is a broken plan view showing that portion of the bicycle-frame to which my improved driving-gear is attached. Fig. 3 is a broken elevation showing a detached portion of the frame in which bearings are provided for my improved gears.

Similar reference-letters denote corresponding parts in all the views.

A represents the wheels.

B is the upper tube, and C the lower tube. D is the head or socket carrying the front fork and to which one end of the tubes B and C is braced in the usual manner.

E is the perch, and F the crank-hanger to which the lower end of the tube C and said perch are attached by a braced joint.

In order to adapt the frame to my improved gears, I provide a bracket G at the rear of the perch, and this is provided with bearings $g\ g'$, which carry loose pulleys.

H is a brace connecting the lower portion of the perch E and the tube C, so as to strengthen the perch at that point to which the bracket G' is attached. The rear fork I is pivotally attached at $i$ to the bearing of the bracket G, and near the free end of said fork is pivotally connected the stay J, the upper end of said stay being loosely fitted to a suitable socket rigidly connected to the perch and acted upon by any suitable spring, as represented at K, such construction causing the crank-hanger to move vertically toward and away from the ground and producing a constantly-varying forward-and-backward movement of the crank-shaft either faster or slower than its natural rotative course relative to the rotation of the driving-wheel at any given speed, and this jerky movement of the crank-shaft, however slight it may be, is quite sufficient to be felt by a rider having his feet upon the pedals. To arrive at this, I provide a loose pulley L, preferably grooved, as at $l$, and mounted upon the pivotal connection of the fork I, and a loose sprocket M is mounted at $g'$ upon the bracket G, the driving-chain N passing around ordinary sprockets, the larger one, O, being mounted in the crank-hanger F and the smaller one, P, being mounted on the hub of the rear or driving wheel, as shown. Both the loose pulley L and the wheel M may be grooved, so as to carry the chain N, or one of them may be provided with teeth and made into a sprocket, as is shown at M. The pulley L is of a diameter equal to the sprocket P on the driving-wheel and so mounted that its periphery is above that of either sprocket O P, so that the chain may never be raised or lifted from said pulley L by any yielding motion of the spring-frame, and in order that the effect may be the same as if the chain passed over a pair of sprockets of equal diameter, under which conditions there could be no such jerky motion of the cranks as above mentioned, the wheel or sprocket M is mounted under the lower portion of the chain at a point to raise the chain between said loose pulley L and the sprocket O, this insuring continual contact of said chain with opposite sides of said loose pulley without regard to the yielding motion of the rear fork or crank-hanger.

Having described my invention, what I claim is—

1. As a means of preventing any jerky motion of the cranks in a bicycle having the rear fork and stay pivotally attached to the frame, suitable driving mechanism comprising an ordinary large and small sprocket and connecting-chain, an intermediate loose pulley of equal diameter with said small sprocket and mounted on a plane above that of either sprocket, and a loose sprocket located forward of said loose pulley and adapted to hold the chain and said pulley in contact, said chain being in contact with both the upper and lower sides of the loose pulley.

2. In combination in a bicycle, with the perch and frame bars E, C, a bracket extending rearwardly in relation to the crank-hanger and perch, a pair of journal-bearings $g$, $g'$, on said bracket, a loose pulley L and the movable rear forks having a common axis, the crank-sprocket O, the drive-wheel sprocket P, the axis of said loose wheel being fixed in relation to the crank-sprocket and having its periphery in a higher plane than the peripheries of the sprockets and a loose sprocket having its journal supported in the bearing $g'$, substantially as described.

3. In combination in a bicycle with the frame, the crank-sprocket journaled therein, the rear forks pivotally supported to have movement up and down, the sprocket at the rear ends of said movable forks, the chain extending between the sprockets and means to give both the upper and lower portions of the chain an angular course between the sprockets, said means comprising a loose pulley at the pivot of the rear fork with means for holding the lower part of the chain constantly in contact with the pulley, said pulley being so located that the upper part of the chain always contacts therewith, substantially as described.

In testimony whereof I affix my signature in presence of two witnesses.

CYPRIEN SOUCY, Jr.

Witnesses:
 J. B. THURSTON,
 EMILE H. TARDIVEL.